United States Patent Office 3,234,101
Patented Feb. 8, 1966

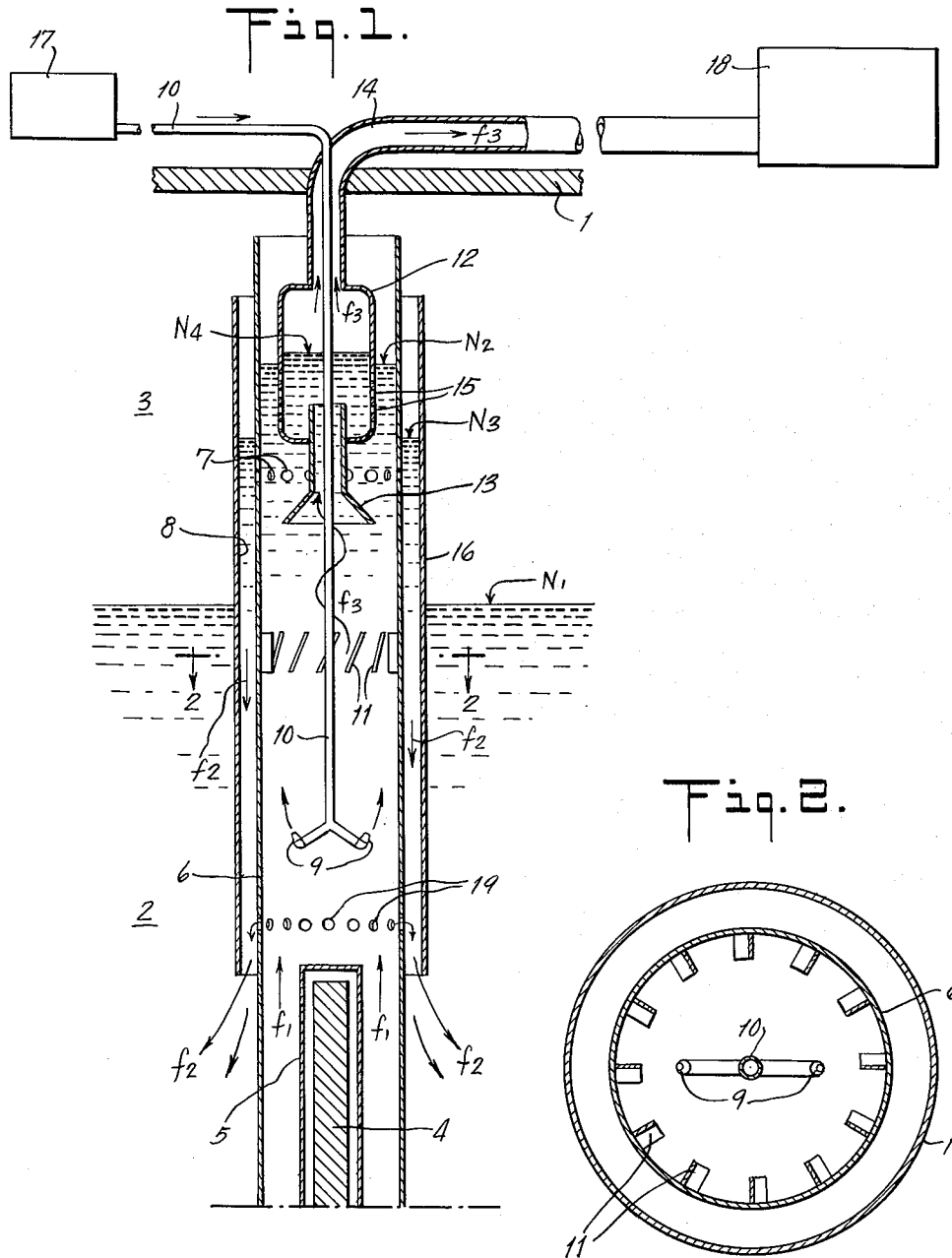

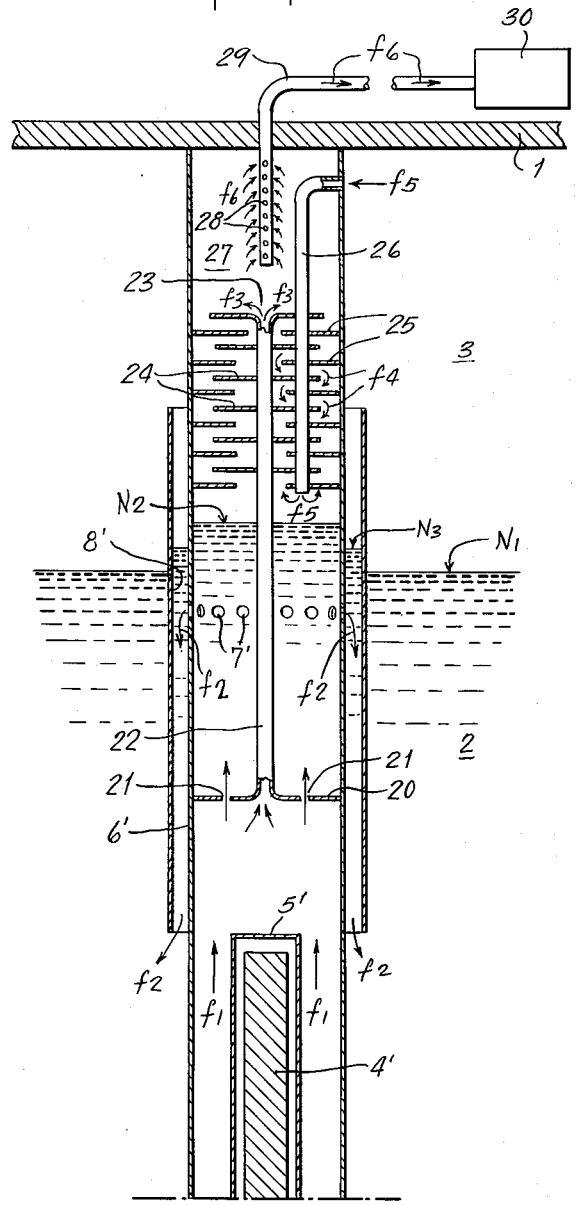

3,234,101
BURST-SLUG DETECTION EQUIPMENT FOR NUCLEAR REACTORS
Louis Berthod, Grenoble (Isere), France, assignor to Societe Grenobloise d'Etudes et d'Applications Hydrauliques, Grenoble, France, a corporation of France
Filed Feb. 19, 1963, Ser. No. 259,647
Claims priority, application France, Feb. 23, 1962, 4,436; Dec. 28, 1962, 4,523
4 Claims. (Cl. 176—19)

This invention relates to improved equipment for detecting a burst slug in a liquid phase cooled nuclear reactor.

In a nuclear reactor of the indicated type the fuel cell is usually cooled by feeding the cooling heavy water into the bottom of the cell so that it flows upwardly past the fuel rod can to the upper portion of the cell from whence it is discharged from the cell in any suitable manner. The art has heretofore also used this cooling water as a means for detecting the presence of a possible burst slug in the reactor. In accordance with one practice in which the cooling water is so employed, a part of the cooling liquid that is passed from the upper portion of the cell, is brought into contact with a gas capable of entraining any gaseous fission products which may have been added to the cooling fluid because of a burst slug as it flows past the fuel rod can. The entraining gas is then separated from the part of the cooling liquid being so tested in an appropriate device and conveyed to suitable apparatus for measuring the activity of the gaseous fission products. This method of testing for a burst slug has certain disadvantages which render its use not entirely satisfactory. In accordance with a later method conceived by the art, the entraining gas is injected into the cooling liquid before it is fed into the bottom part of the cell and after it passes with the cooling liquid along the fuel rod can, such gas is separated from the cooling liquid in a gas separator provided at the top of the fuel rod can so that such separation takes place just above the active slug. The separated gas, as well as any entrained gaseous fission products resulting from a burst slug, are then conveyed to the apparatus for measuring the activity of such gaseous fission products. The disadvantage of this second system is that in its operation it introduces gas all along the moderator and thus affects the reactivity of the reactor.

It is the principal purpose of this invention to provide an improved method which brings the entraining gas into contact with the cooling liquid in such manner as to overcome the disadvantages of the two aforementioned prior methods of detecting burst slugs.

In accordance with the invention, this purpose is essentially achieved by bringing the entraining gas into contact with a portion at least of the cooling liquid at a point in the cell where it will not affect the reactivity of the reactor, i.e., at a point of the cell located between the vicinity of the top of the fuel rods or slugs therein and the upper end of the cell, and then conveying the gas, together with any gaseous fission products it may have removed from the contacted cooling liquid, from the fuel cell at a point above the fuel rods to the apparatus provided to measure the activity of the gaseous fission products. Since in the practice of this method, the entraining gas is brought into contact with the cooling liquid at a point which may be located in a range extending from just below the top of the fuel rod, for example, 10 to 20 centimenters below the top of the fuel rod, at which the reactivity of the reactor would practically not be effected, to a place in the cell spaced beyond the top of the fuel rod in the direction of flow of the cooling liquid, its practice does not affect the operation of the reactor, so there will be no substantial fall-off of reactivity due to gas pockets, nor any substantial increase of reactivity should the entraining gas cease to arrive.

A better understanding of the invention will be obtained from a perusal of the following description when read in connection with the accompanying drawings which illustrate by way of example different methods of practicing the invention, and in which FIG. 1 is a schematic elevational view of the upper portion of a liquid phase cooled nuclear reactor of known construction and having a single reactor cell provided with gas injection and gas removal means located above the fuel rod can in accordance with the invention;

FIG. 2 is a sectional view taken along the line 2—2 of FIG. 1; and

FIG. 3 is a view similar to that of FIG. 1 and illustrating another manner in which the invention may be practiced.

In the drawings, the numeral 1 indicates generally the tank of a known type of liquid phase cooled nuclear reactor and in which is located in upright position a vertical reactor cell 6 which usually extends upwardly from a water distributing box (not shown) mounted on the bottom of the tank and toward the top wall of the tank. As is customary in such a reactor, the tank is filled to a point short of its top wall and of the upper end of the cell 6, with cooling liquid 2, such as heavy water, so that between the level $N_1$ of such liquid and the top wall of the tank there is provided a space 3. Located in the cell 6 below the water level $N_1$ is provided the usual axially disposed uranium rods or slugs 4 contained in a can 5. The fuel rods 4 usually have a length of about 1½ meters and are so arranged in the cell that there is provided in the cell above the tops of such rods a free space of about 1 meter in length and constituting the major part of the upper half of the cell. As is indicated by the arrows $f_1$, the cooling liquid 2 is in the usual manner forced under pressure by means of a suitable pump into the water distributing box from whence it flows into the bottoms of the cells 6 and thence upwardly along the rods 4 and the cans 5 thereof. Each cell is provided in the wall thereof above the upper end of its can 5 with a plurality of return ports 7 for returning the cooling water to the main body 2 thereof.

Enclosing the upper end portion of the cell 1 and extending from a point below the level $N_1$, of the cooling liquid upwardly into the space 3 to a point above the return ports 7, is a coaxial tube 16 which together with the cell wall forms an open annular passage 8 around the cell wall. Thus, the cooling heavy water passing out through the ports 7, enters annular passage 8, and flows down such passage to be returned at the lower end thereof back into the main body 2 of such water, as is indicated by the arrows designated $f_2$. As a result of the losses of head caused by ports 7 and annular passage 8, the heavy water levels in the cell and in the annular passage 8 settle at $N_2$ and $N_3$, respectively.

It will be understood from the foregoing, that the cooling heavy water drawn from the body 2 thereof in the tank 1, constantly circulates in through the bottom of the cell 6, up past the uranium rods 4 in the can 5 to the discharge ports 7, then down through the annular passage 8 to be returned to the body 2 at the lower end of member 16. In the event of a burst slug, gaseous fission products will become dissolved in the cooling liquid as it flows past the can 5 and such products will flow with the liquid toward the discharge ports 7. In accordance with the invention, an entraining gas is constantly supplied to the liquid stream at points 9, 9 located between the vicinity of the top of the can 5 and the discharge ports 7 to extract any gaseous fission product that might have been added to the cooling liquid because of a burst slug.

The points 9, 9 are actually discharge openings in the lower end of a pipe line 10 that extends axially up through the cell 6 and through the head of the tank 1 and is connected to an adequate external source of supply 17 of a gas suitable for the stated purposes, such as helium gas.

The gas discharged through the openings 9, 9 picks up any dissolved gaseous fission products that may be present in the cooling water flowing up past such openings and is itself entrained in the upwardly flowing liquid. Above the openings 9, the heavy water containing the entraining gas and any gaseous fission products it may be carrying, flows through a set of fins 11 designed and arranged to impart to the composite stream a rotary movement such that there are created centripetal forces of sufficient magnitude to cause the gaseous products the composite stream is carrying to concentrate in the center of the composite stream and form a core up the length of the latter. This centrally located gas stream is guided by an annular or funnel-shaped deflector 13 into a cylindrical container 12 located in coaxial relation in the upper end of cell 6 so that the upper portion thereof projects above the liquid level $N_2$ in such cell. The deflector 13 is supported in coaxial depending relation by the bottom wall of the container 12. Connected to the top of the container 12 is one end of a pipe 14 which is connected at its other end to a suitable detection device 18 of known construction. It will thus be understood that the gas stream guided into the container 12 by the deflector 13, will enter the terminal chamber formed in the upper portion of such container, and then discharge from such chamber through the pipe 14 to the detection device, as is indicated by the arrows designated $f_3$ in FIG. 1. The small amount of water that is carried along with the gas into the container 12 will settle out at a level $N_4$ at the bottom of the terminal chamber in container 12 and will run back into the cell 6 through a set of orifices 15 provided in the wall of container 12 below the liquid level $N_2$ in such cell.

The cooling water in cell 6 is subjected to centrifugal forces as a result of the swirling motion imparted thereto by the fins 11 and such forces enhance the discharge of the water from the cell through the ports 7 and unto the annular passage 8. As has been described, the water discharged into the passage 8 flows down the same and back into the moderating heavy water body 2 at the bottom end of such passage.

It will be observed that in the above described system, both the injection of the entraining gas and the separation of the gaseous products from the cooling water occur at places within the cell at which such operations will have practically no effect on the reactivity of the reactor. Thus, the entraining gas may be brought into contact with the cooling liquid at a place located between the vicinity of the top of the fuel rod where the reactivity of the reactor will be substantially unaffected by the feed or the stoppage in the feed of such gas, and the fins 11. On the other hand, the separation of the gaseous products from the cooling water takes place in the uper portion of the cell above the fins 11 which are located substantially above the uranium rods.

It will be noted also that if the above described system is provided only with discharge ports above the place of injection of the entraining gas, such as the ports 7, all of the upward flowing cooling liquid will be brought into contact with the entraining gas. It may be found desirable in certain installations to bring the entraining gas into contact with part only of the cooling liquid flowing up from the uranium rods. This can be accomplished by providing additional discharge ports 19 in the wall of cell 6 between the uranium can 5 and the gas discharge nozzles 9 so that part of the cooling liquid can flow directly back into the heavy water body 2 without being submitted to the gas injection from pipe 10. It will be understood also that where a dummy can is fitted above the final fuel rod, as is sometimes done in practice, such dummy can may be employed as the means for injecting the entraining gas into the cooling liquid by connecting pipe 10 to the same and providing the wall of such dummy can with appropriate discharge ports.

FIG. 3 shows another embodiment of the invention in the use of which only part of the cooling liquid is brought into contact with the entraining gas. As in the previously described embodiment, the cooling heavy water from the body 2 thereof in the tank 1 flows into the cell 6' through the bottom thereof, upwardly past the uranium rods 4' in the can 5' and to the discharge ports 7', as indicated by the arrows $f_1$. Also as in the previous embodiment the cooling water discharging from the ports 7' passes down through an annular passage 8' and is returned by the latter to the main body 2 of cooling heavy water as indicated by the arrows $f_2$. In the instant embodiment however, the discharge ports 7' perform a function somewhat similar to that of the ports 19 in the previous embodiment, in that the part of the cooling water discharged therethrough has not been subject to contact with an entraining gas, but is being returned directly to the main body 2 of heavy water without being submitted to the gas treatment.

The part of the cooling heavy water that is to be subjected to the gas treatment, is separated from the part left untreated at a diaphragm 20 provided across the cell 6' at a place located between the can 5' and the discharge ports 7'. The diaphragm 20 is provided with a plurality of ports 21 which permit part of the cooling water rising from the can 5' to pass through the diaphragm 20 to ports 7' for direct return to the main body 2 of cooling water as above described. The diaphragm 20 at its center has an opening which forms the inlet opening of a coaxial pipe 22 that extends upwardly therefrom to a point substantially above the level $N_2$ of the cooling liquid in the cell 6'. The ports 21 are made sufficiently small, about 1½ millimeters in diameter, to create sufficient loss of head in the diaphragm 20 to require the cooling water to rise to the upper end 23 of the pipe 22. The part of the cooling water rising in the pipe 22 will arrive at the upper end 23 of such pipe so that it will just overflow in the manner indicated by the arrows $f_3$ to trickle and dripple down along the alternately arranged baffle plates 24 and 25. The plates 24 are disc like and are mounted as a spaced series on the portion of pipe 22 which extends above the level $N_2$ of the liquid in the cell 6'. The plates 25 are annularly-shaped plates which are secured at their outer peripheries to the wall of cell 6' and which are of sufficient width so that their inner free edge portions substantially overlap the outer free edge portions of the plates 24. Thus the cooling water overflow will trickle and drip down the plates 24, 25 in the manner indicated by the arrows $f_4$, until such water reaches the water level $N_2$ in the cell 6'.

The entraining gas, such as helium gas, to be brought into contact with the cooling water as it trickles and drips in the upper portion of cell 6' in the manner above indicated, is stored in the space 3 above the body 2 of cooling water in the tank 1. The entraining gas passes from the storage space 3 through a pipe 26 and is delivered by the latter to a point between the water level $N_2$ and the lowermost baffle plate as indicated by the arrows $f_5$. The gas thus delivered into cell 6' flows upwardly through the devious passage afforded by the baffle plates 24, 25 and in so doing comes into close contact with the heavy cooling water trickling and dripping down such plates. As a result of this intimate contact of the two fluids, the entraining gas will pick up any dissolved gaseous fission products that may be present in the cooling water due to a slug burst.

The entraining gas containing any gaseous fission products that might have been present in the cooling water continues its flow upwardly above the plates 24, 25 into the space 27 at the upper part of cell 6'. From space 27, the entraining gas is drawn out of the cell through a set of ports 28 provided in the entry end of a discharge pipe 29, as indicated by the arrows $f_5$. The pipe 29 conducts the entraining gas to a suitable detection device 30 of known construction.

It will be observed from the foregoing discussion of the two embodiments illustrated by way of example, that in accordance with the invention the entraining gas is brought into contact with all or part of the upward flowing cooling liquid in the fuel cells at points located between the vicinity of the tops of the fuel rods in such cells and the upper ends of such cells, and this contact may be made either by an injection of the entraining gas directly into the cooling fluid as demonstrated by the embodiment of FIG. 1 of the drawings, or by spraying, dripping or trickling the cooling liquid into a chamber in the upper part of the cell and containing the entraining gas as practiced in the embodiment of FIG. 3 of the drawings. In either case, the entraining gas may be supplied from a suitable exterior source, as in FIG. 1, or from the upper part of the tank containing the main body of the cooling heavy water, as in FIG. 3, or in any other suitable fashion. It will thus be understood, that while the two disclosed embodiments illustrate several methods by which the invention may be practiced, the latter is not limited to such embodiments, and it is intended that all embodiments coming within the scope of the appended claims shall be covered by the latter.

I claim:

1. Burst slug detection means for a liquid phase cooled nuclear reactor composed of a vertical reactor cell having fuel rods and means for causing the flow of cooling liquid in such cell upwardly past the fuel rods thereof and into the upper portion of such cell to a place of discharge therefrom, said detection means comprising means for feeding a gas capable of entraining gaseous fission products contained in the cooling liquid, into contact with cooling liquid contained in a portion of such cell located between the vicinity of the tops of the fuel rods thereof and the upper end of such cell, means for conducting cooling liquid from a point located between the fuel rods and said place of discharge of such liquid from the cell, upwardly past such place of discharge and through the level of the cooling liquid in such cell to an elevated point in said cell located substantially above such liquid level, and for discharging the thus conducted cooling liquid into the cell area above such level, said feeding means bringing the gas into the cell at a place located between such level and said elevated point so that it is contacted by the cooling liquid moving from such point toward said liquid level, means positioned between said elevated point and the place where the gas is brought into said cell for causing the gas and liquid to flow in opposite directions in such intimate relation as to enable the gas to entrain any gaseous fission products contained in the liquid, means for withdrawing the gas with any gaseous fission products entrained therein from an upper portion of such cell spaced above the fuel rods thereof, and means for measuring the activity of the gaseous fission products in the withdrawn entraining gas.

2. Burst slug detection means for a liquid phase cooled nuclear reactor composed of a vertical reactor cell having fuel rods and means for causing the flow of cooling liquid in such cell upwardly past the fuel rods thereof and into the upper portion of such cell to a place of discharge therefrom, said detection means comprising means for feeding a gas capable of entraining gaseous fission products contained in the cooling liquid, into contact with cooling liquid contained in a portion of such cell located between the vicinity of the tops of the fuel rods thereof and the upper end of such cell, means providing a chamber in the upper portion of such cell above the level of the cooling liquid therein, means for guiding entraining gas along a given path in intimate contact with the cooling liquid toward such chamber for collection therein at the end of such given path with any gaseous fission products entrained therein, said guiding means including means for providing the combined cooling liquid and entraining gas with a swirling motion such that centripetal forces are created to cause the gaseous material in the cooling liquid to concentrate at the central portion of the upwardly flowing cooling liquid, and tubular means for guiding such centrally located gaseous material to said chamber, means for withdrawing the gas and fission products entrained therein collected in such chamber, and means for detecting the gaseous fission products in the withdrawn entraining gas.

3. Burst slug detection means for a liquid phase cooled nuclear reactor composed of a vertical reactor cell having fuel rods and means for causing the flow of cooling liquid in such cell upwardly past the fuel rods thereof and into the upper portion of such cell to a place of discharge therefrom, said detection means comprising means for feeding a gas capable of entraining gaseous fission products contained in the cooling liquid, into contact with cooling liquid contained in a portion of such cell located between the vicinity of the tops of the fuel rods thereof and the upper end of such cell, means providing a chamber in the upper portion of such cell above the level of the cooling liquid therein, means for guiding entraining gas along a given path in intimate contact with the cooling liquid toward such chamber for collection therein at the end of such given path with any gaseous fission products entrained therein, said guiding means comprising a vertical pipe extending from a point located above the fuel rods upwardly toward such chamber to an elevated point located substantially above the level of the cooling liquid and the place where the gas is brought into the cell by said feeding means, and means between said latter place and said elevated point for causing the gas and liquid to flow in opposite directions along a tortuous path which directs the liquid towards said level and the gas toward said chamber, means for withdrawing the gas and fission products entrained therein collected in such chamber, and means for detecting the gaseous fission products in the withdrawn entraining gas.

4. The method of detecting a burst slug in a liquid phase cooled nuclear reactor, which comprises feeding a gas capable of entraining any gaseous fission products picked up by the cooling liquid as it passes through such reactor, into contact with the cooling liquid as it flows between the vicinity of the tops of the fuel rods in a cell of the reactor and the upper end of such cell and before such contacted liquid is discharged from the reactor cell, withdrawing the gas with any gaseous fission products entrained therein from a portion of the cell spaced beyond the fuel rods in the direction of the flow of the cooling liquid therethrough, a part of the cooling liquid being conducted to an elevated point located substantially above the level of such liquid in the reactor cell and then discharged at such point into a part of the cell above such level, and the entraining gas being fed into such cell part at a point adjacently above such level, the discharged liquid and gas being brought into close contact in such cell part before such gas is withdrawn from the cell, and measuring the activity of the gaseous fission products in the withdrawn entraining gas.

References Cited by the Examiner
UNITED STATES PATENTS 2,998,519   8/1961   Tunnicliffe _____ 176—19
3,073,767   1/1963   Whitham et al. _____ 250—83.6

OTHER REFERENCES

Nuclear Power, July 1959, pages 77–79, "Burst Slug Detection."

REUBEN EPSTEIN, *Primary Examiner.*

CARL D. QUARFORTH, *Examiner.*